US008095945B2

(12) United States Patent
Isoshima et al.

(10) Patent No.: US 8,095,945 B2
(45) Date of Patent: Jan. 10, 2012

(54) TRAY ENABLING OPTICAL UNIT HEAT REDUCTION

(75) Inventors: Nobuyuki Isoshima, Hitachinaka (JP); Yukinobu Abe, Matsudo (JP); Takayuki Fujimoto, Tsuchiura (JP); Ikuo Nishida, Ebina (JP); Masahiro Matsuo, Tokyo (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 534 days.

(21) Appl. No.: 11/529,344

(22) Filed: Sep. 29, 2006

(65) Prior Publication Data
US 2007/0079312 A1    Apr. 5, 2007

(30) Foreign Application Priority Data
Oct. 3, 2005   (JP) .................................. 2005-289500

(51) Int. Cl.
*G11B 33/14* (2006.01)
*G11B 17/03* (2006.01)
*G11B 17/04* (2006.01)
*G11B 33/02* (2006.01)

(52) U.S. Cl. ........................................ 720/649; 720/603
(58) Field of Classification Search .................. 720/603, 720/646, 649, 648
See application file for complete search history.

(56) References Cited

U.S. PATENT DOCUMENTS

| 6,392,976 | B1 * | 5/2002 | Lin ................................ 720/611 |
| 6,621,784 | B2 * | 9/2003 | Liao et al. ..................... 720/601 |
| 7,210,151 | B2 * | 4/2007 | Hsieh et al. .................... 720/649 |
| 2001/0043530 | A1 * | 11/2001 | Nakatsuka et al. .......... 369/53.1 |
| 2001/0043542 | A1 * | 11/2001 | Omori et al. .................. 369/75.2 |
| 2003/0058772 | A1 * | 3/2003 | Takagi et al. ................. 369/75.1 |
| 2003/0133390 | A1 * | 7/2003 | Chuang et al. ............... 369/75.2 |
| 2004/0158844 | A1 * | 8/2004 | Ohta et al. ..................... 720/603 |
| 2006/0288358 | A1 * | 12/2006 | Wu ................................ 720/649 |
| 2007/0006241 | A1 * | 1/2007 | Wang et al. ................... 720/611 |

FOREIGN PATENT DOCUMENTS

| JP | 11-025667 | 1/1999 |
| JP | 2000-285555 | 10/2000 |
| JP | 2003-257022 | 9/2003 |
| JP | 2004-310883 | 11/2004 |
| JP | 2005-158219 | 6/2005 |
| JP | 2005-166218 | 6/2005 |
| JP | 2005-327347 | 11/2005 |

* cited by examiner

*Primary Examiner* — Craig A. Renner
*Assistant Examiner* — Gustavo Polo
(74) *Attorney, Agent, or Firm* — Antonelli, Terry, Stout & Kraus, LLP.

(57) ABSTRACT

An optical disc drive includes a rotation device that rotates an optical disc in a clockwise direction when an upper surface of the optical disc is viewed, a disc mounting portion for mounting of the optical disc thereon has a recess portion, and an optical pickup which irradiates a laser beam on a lower recording surface of the optical disc. The disc mounting portion includes a first penetrating opening portion therethrough that extends from a center area of the recess portion to a periphery of the recess portion. The disc mounting portion further includes a single second penetrating opening portion therethrough being provided at a rear of the disc mounting portion and periphery at an upstream side of the clockwise rotating direction with respect to a center line of the first penetrating opening portion extending from a front to the rear of the disc mounting portion.

12 Claims, 10 Drawing Sheets

A-A CROSS-SECTION IN FIG.2

FIG.5

B-B CROSS-SECTION IN FIG.2

FIG.12
C-C CROSS SECTION IN FIG.2

TRAY ENABLING OPTICAL UNIT HEAT REDUCTION

BACKGROUND OF THE INVENTION

The present invention relates to an optical disc drive for optically recording information onto a recording medium, or for reading out information recorded onto the recording medium, and in particular, it relates to a heat radiation technology for an optical pickup within the optical disc drive.

Speedup on data transfer speed and a large-size of storage capacity thereof are demanded for the optical disc drive, and accompanying with that, the disc rotation speed is increasing. And, for the purpose of conducting the recording or the reproducing of information onto/from the optical disc, which is rotated at the high rotation speed, it is in a tendency that an output power of a laser beam source is also increasing.

However, accompanying with such the speedup of the data transfer speed within the optical disc drive, there come up the following drawbacks, i.e., an increase of vibration of the optical disc due to the high speed thereof, an increase on rotation speed of a motor for providing a driving force to the optical disc, and an increase of heat-generation due to an increase of the output of the laser beam source.

An optical disc drive for obtaining a solution of the drawbacks accompany with such high-speed of the data transfer speed is described in, for example, Japanese Patent Laying-Open No. 2000-285555 (2000) (hereinafter, called by "Patent Document 1"). In accordance with the invention described in this Patent Document 1, suppression can be made upon pressure distribution, which is generated due to airflow generated accompanying with rotating operation of a rotary mechanism, and thereby obtaining a lowering of the vibration of the optical disc due to the high speed, within the structures thereof.
[Patent Document 1] Japanese Patent Laying-Open No. 2000-285555 (2000)

BRIEF SUMMARY OF THE INVENTION

However, within the invention described in the Patent Document 1 mentioned above, the increase of heat-generation accompanying the increase of an output of the laser beam source and an increase of temperature are not taken, sufficiently, into the consideration thereof. If excess increases of temperature occur, frequently, in the laser beam source, accompanying with the increase of an amount of heat-generation of the laser beam source, deterioration can easily advance within the laser beam source. And, when advancing the deterioration within the laser beam source, then a possibility that the recording or reproducing of information cannot be conducted with accuracy may cause. Accordingly, a technology is required for promoting or accelerating heat-radiation of the optical pickup, mounting the laser beam source therein, for the purpose of suppressing the temperature of the laser beam source from increasing excessively.

According to the present invention, an object thereof is to provide an optical disc drive, enabling recording/reproducing of information, correctly, while suppressing an increase of temperature of the optical pickup with accelerating the heat-radiation of the laser beam source.

For accomplishing the object mentioned above, according to the present invention, there is provided an optical disc drive, comprising: a housing; a disc transfer member for transferring an optical disc, having a disc mounting portion for mounting the optical disc thereon, and being movable into an inside and a front of said housing; a rotation device for rotationally driving said optical disc; an optical pickup, having one or more of laser diode(s) for generating a laser beam for conducting recording/reproducing of information onto/from said optical disc, and for irradiating said laser beam upon said optical disc; and a first penetrating portion, for letting said rotation device and said laser beam passing therethrough, being provided within said disc mounting portion and also in rear of on said disc mounting portion, on said disc transfer member, wherein a second penetrating portion is provided in rear of said disc mounting portion, in an upstream side of rotating direction of optical disc than said first penetrating portion, and said second penetrating portion is larger in area than a total of area(s) obtained by projecting said laser diode(s) onto said optical disc.

Also, for accomplishing the object mentioned above, according to the present invention, there is further provided an optical disc drive, comprising: a housing; a disc transfer member for transferring an optical disc, having a disc mounting portion for mounting the optical disc thereon, and being movable into an inside and a front of said housing; a rotation device for rotationally driving said optical disc; an optical pickup, having one or more of laser diode(s) for generating a laser beam for conducting recording/reproducing of information onto/from said optical disc, and for irradiating said laser beam upon said optical disc; and a first penetrating portion, for letting said rotation device and said laser beam passing therethrough, being provided within said disc mounting portion and also in rear of on said disc mounting portion, on said disc transfer member, and further comprising, a second penetrating portion, being provided in rear of said disc mounting portion, in an upstream side of rotating direction of optical disc than said first penetrating portion, and a protuberance, being provided in an upper side of said disc transfer member, within an upstream side of rotation of said optical disc than said second penetrating portion.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Embodiment 1

Figure 1:
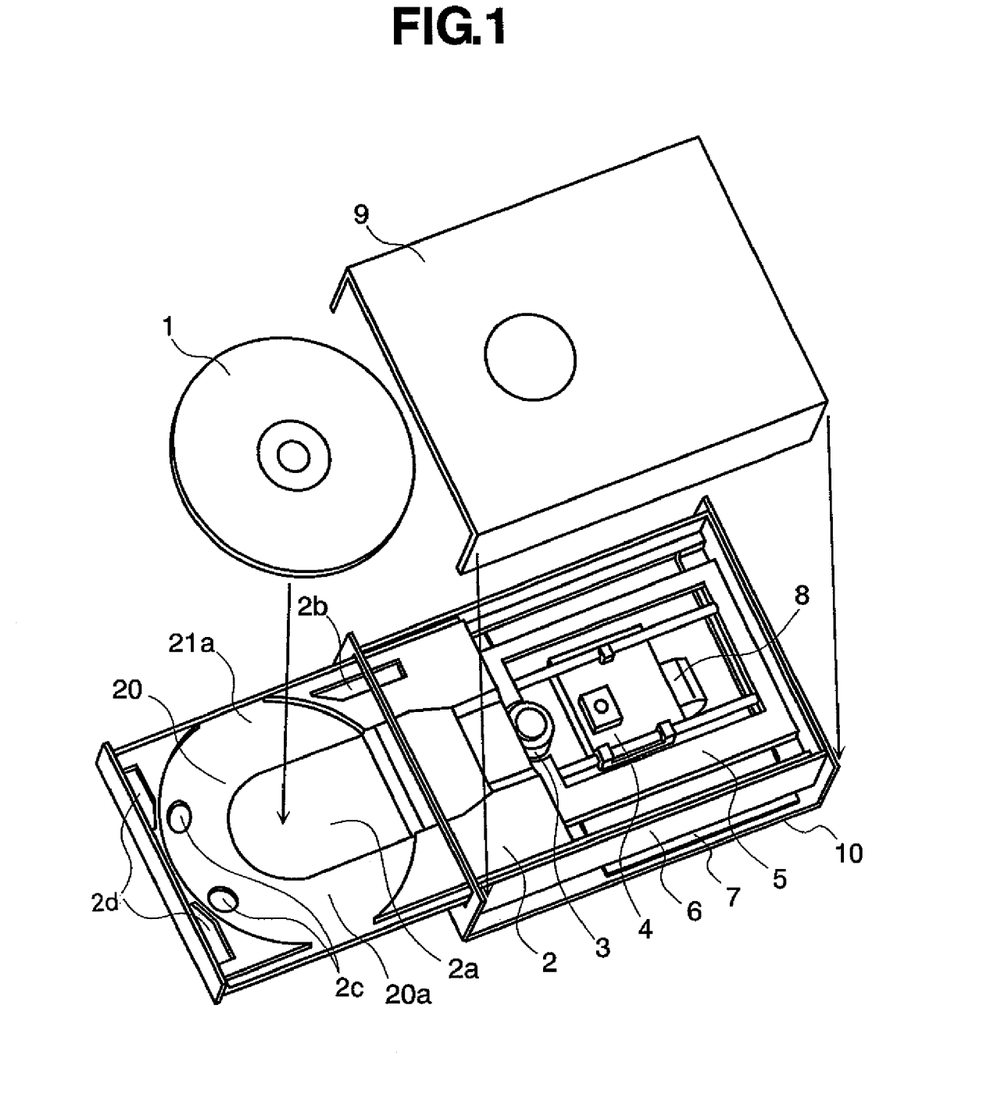
FIG. 1 is an exploded view for showing an optical disc drive, according to a first embodiment of the present invention.
Figure 2:
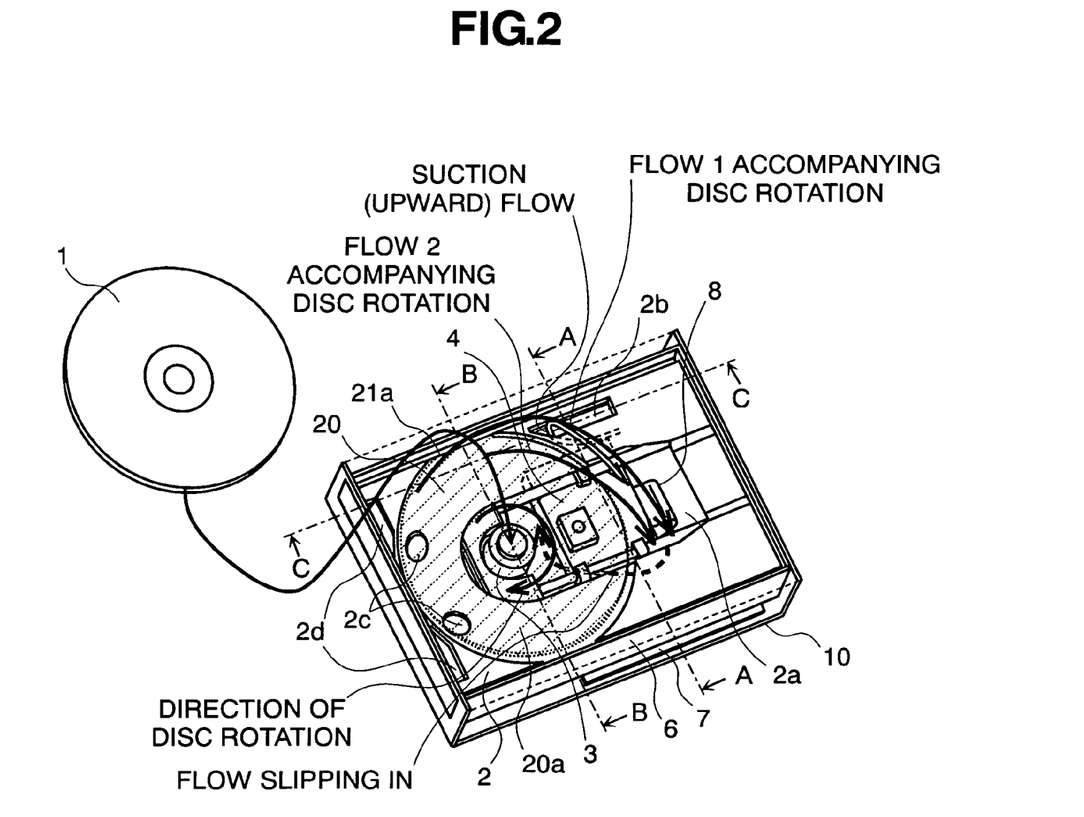
FIG. 2 is a perspective view for also showing the optical disc drive, according to the first embodiment of the present invention.
Figure 3:
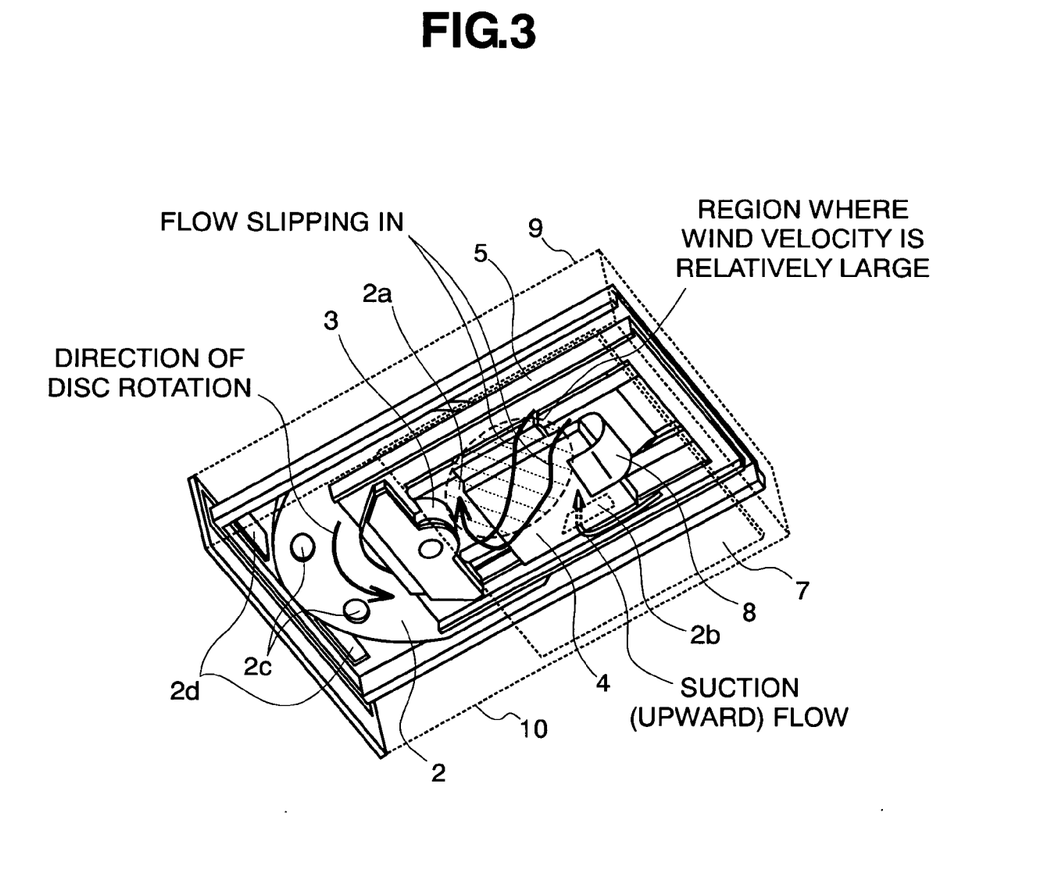
FIG. 3 is also a perspective view for showing the optical disc drive, according to the first embodiment of the present invention.
Figure 4:
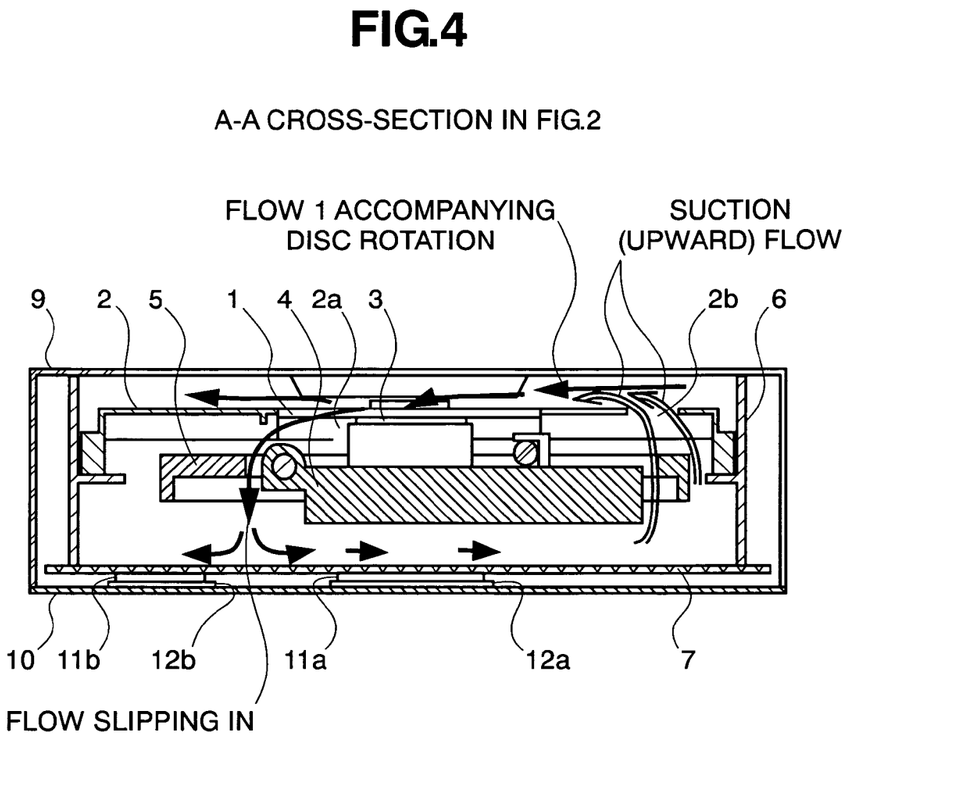
FIG. 4 is an A-A cross-section view in FIG. 2, for showing the optical disc drive, according to the first embodiment of the present invention.
Figure 5:
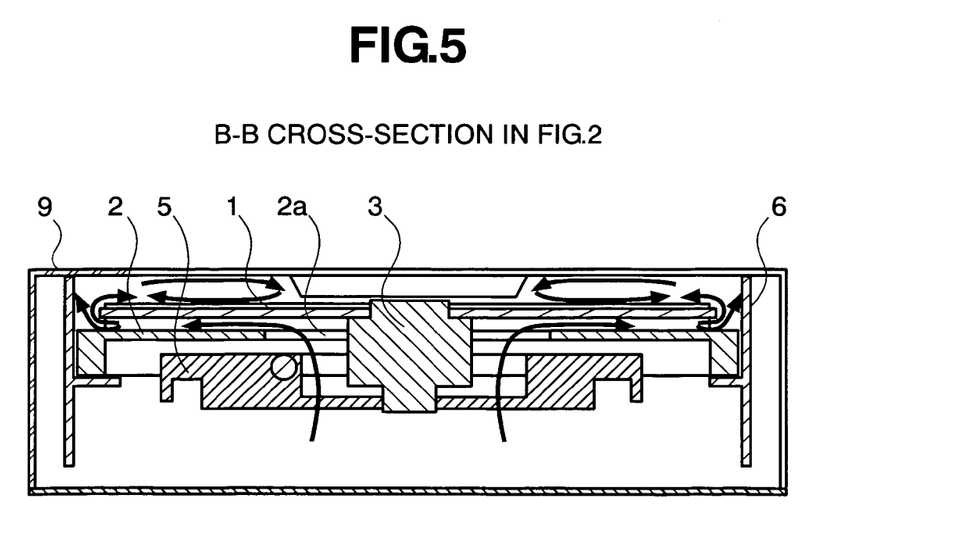
FIG. 5 is an B-B cross-section view in FIG. 2, for showing the optical disc drive, according to the first embodiment of the present invention.
Figure 6:
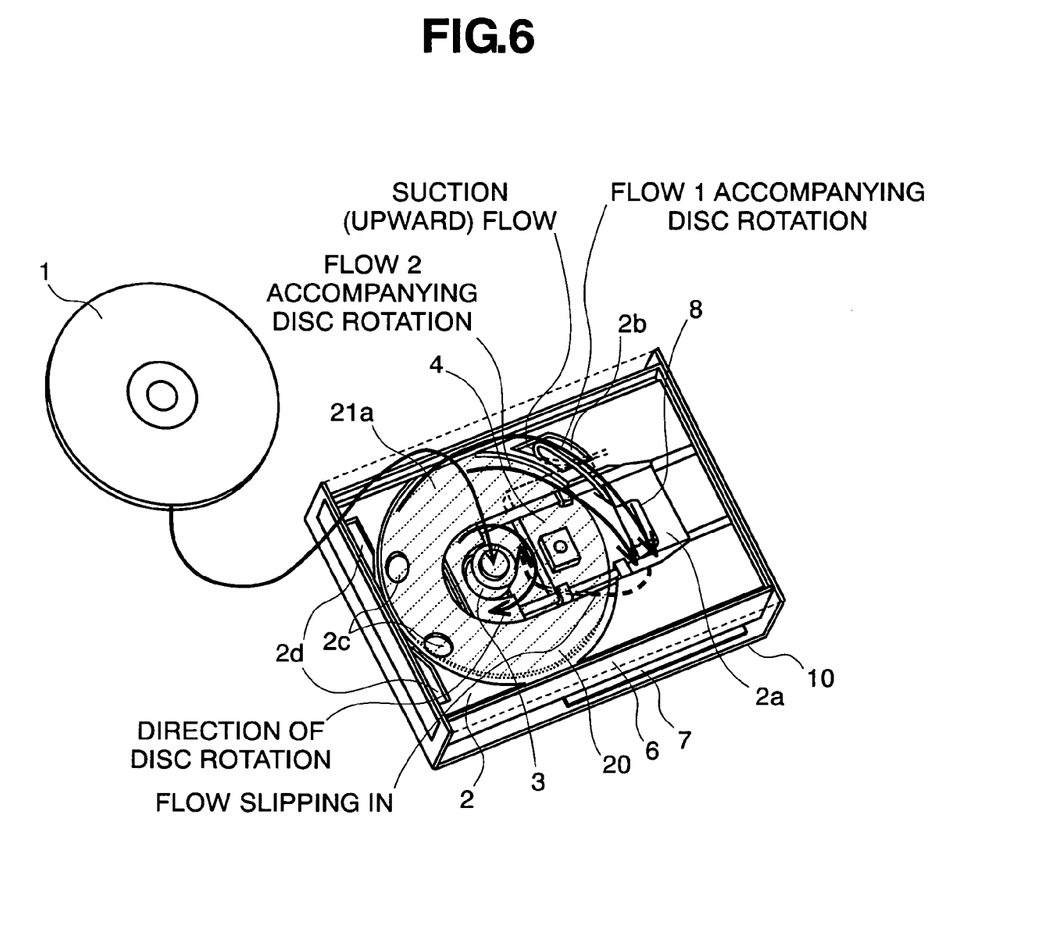
FIG. 6 is also a perspective view for showing the optical disc drive, according to the first embodiment of the present invention.
Figure 10:
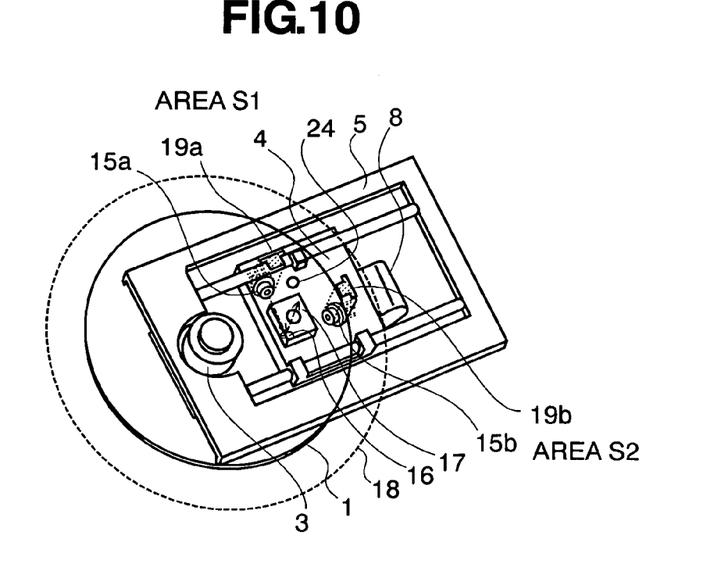
FIG. 10 is a perspective view for showing the optical disc drive, according to a fourth embodiment of the present invention.
Figure 11:
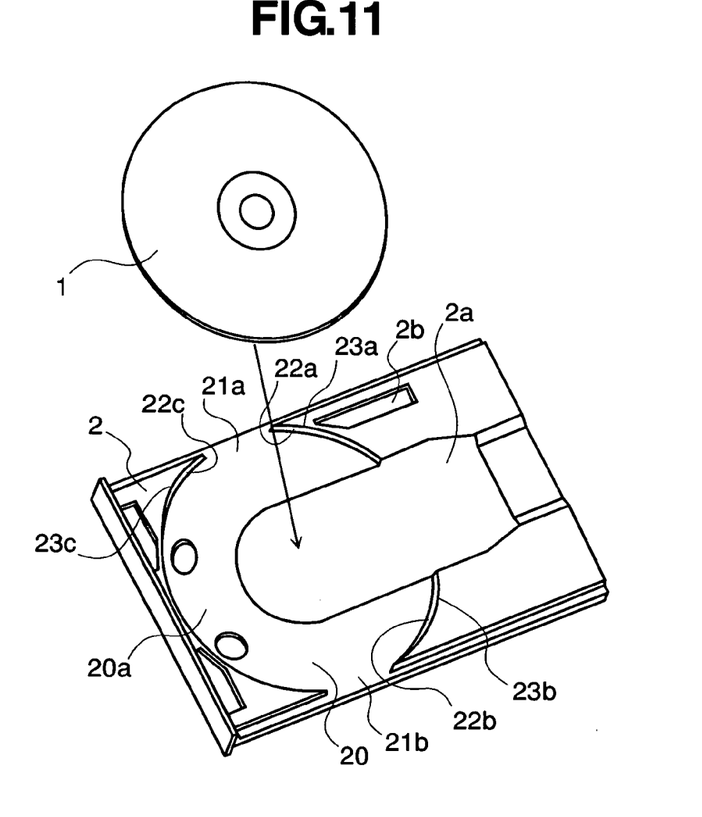
FIG. 11 is a perspective view for showing the optical disc drive, again, according to the first embodiment of the present invention.
Figure 12:
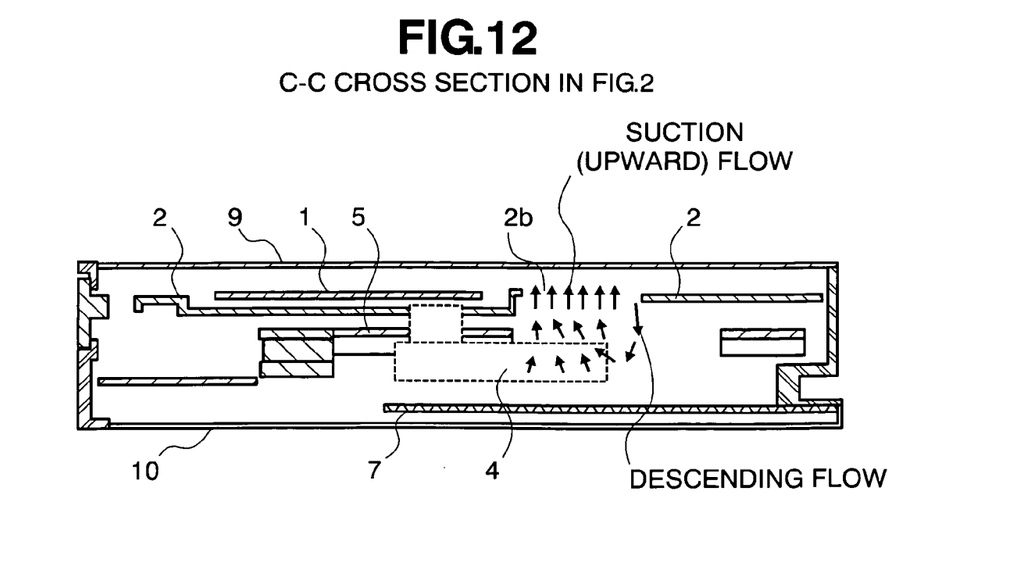
FIG. 12 is a perspective view for showing the optical disc drive, according to the first embodiment of the present invention.
Figure 13:
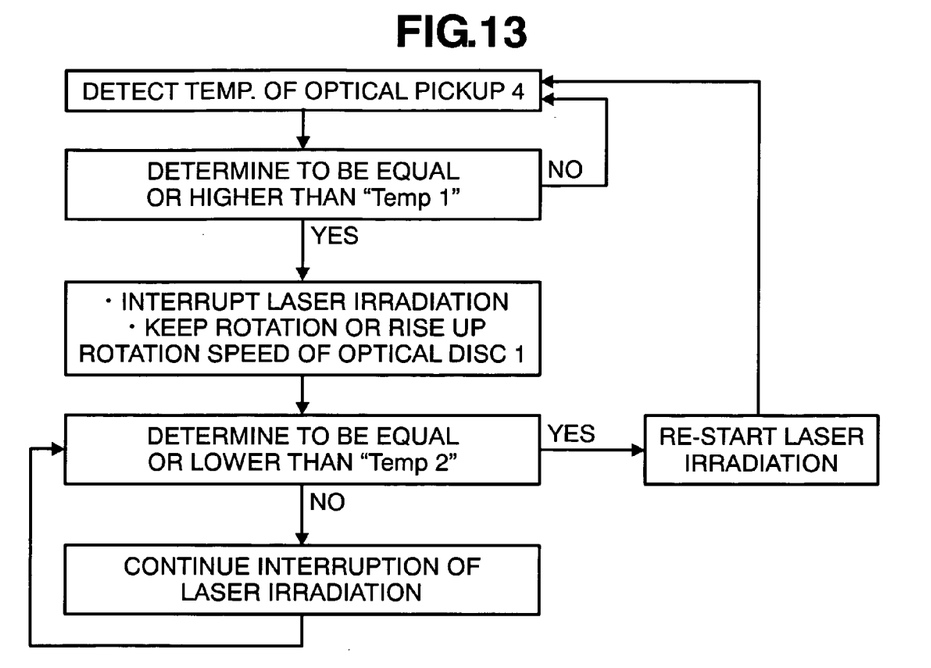
FIG. 13 is a flowchart for showing the operation of the optical disc drive, according to the present invention.
Figure 14:
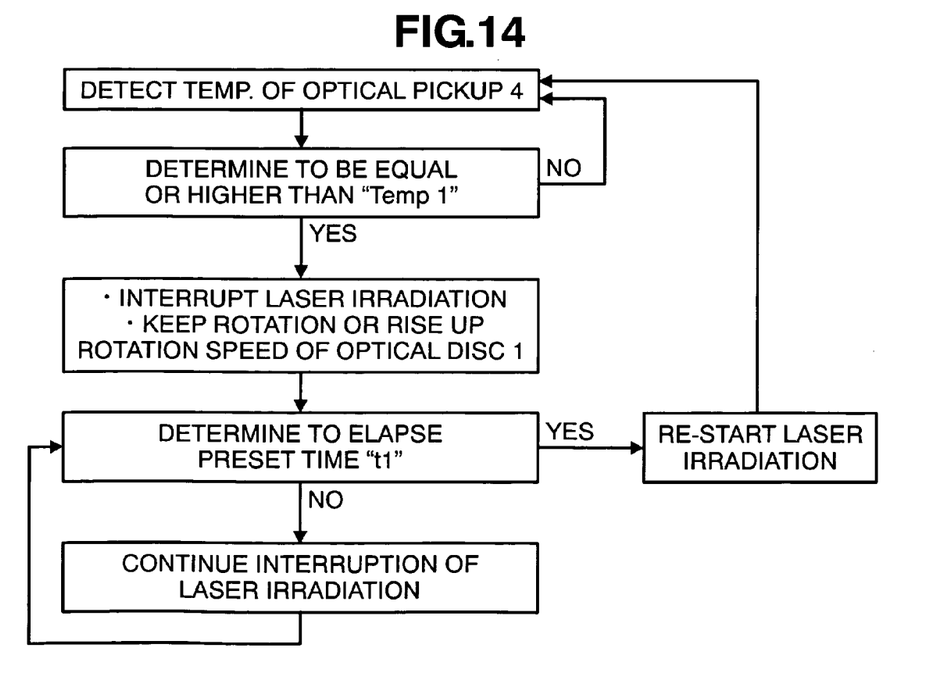
FIG. 14 is also a flowchart for showing the operation of the optical disc drive, according to the present invention.

FIGS. 1-6 and 10-12 are views for explaining a first embodiment of the present invention. FIG. 1 is an exploded view of principle portions of an optical disc drive according to the present invention, and FIG. 2 is a view for showing the drive shown in FIG. 1 under the driving condition thereof, but removing an upper cover or a top case 9, for convenience of explanation thereof. FIG. 3 is a perspective view of the principle portions of the drive shown in FIG. 2, but seen from a lower side obliquely. FIG. 4 is an A-A cross-section view, and FIG. 5 is a B-B cross-section view within FIG. 2. FIG. 6 shows a variation of the first embodiment. FIG. 10 is a view for showing an optical disc 1, an optical pickup 4 and a unit mechanism (or a mechanism) 5, while being taken out from the drive. FIG. 11 is a view for showing a disc transfer member (or a tray) 2. And, FIG. 12 is a C-C cross-section view within FIG. 2.

In this FIG. 1, a reference numeral 1 depicts an optical disc, 2 a disc transfer member for transferring the optical disc 1, 2a a first penetration opening portion of the disc transfer member (or tray) 2, 2b a second penetration opening portion of the tray 2, and 2c and 2d front-side penetration opening portions of the tray 2, respectively. Also, a reference numeral 4 depicts an optical pickup, 5 a unit mechanism including the optical pickup 4 therein, 6 a unit chassis, 7 a control board, 8 a cable for connecting between the optical pickup 4 and the control board 7, 9 an upper cover of a housing 8 (or, a top case), and 10 a lower cover thereof (or, a bottom case), respectively. In FIG. 10, reference numerals 15a and 15b depict laser diodes, which are built within the optical pickup 4, 16 a lens of an optic system, which is also built within the optical pickup 4, 17 a laser beam, 18 an imaginary enlarged surface of the optical disc 1, 19a and 19b projections of the laser diodes 15a and 15b onto the optical disc 1 or the imaginary enlarged surface of the optical disc 1, and 24 a temperature detector. In FIG. 11, a reference numeral 20 depicts a disc mounting portion, 20a a disc mounting plane portion, 21a and 21b disc mounting cutout portions, 22a, 22b and 22c disc mounting convex portions, and 23a and 23b disc mounting upper end portions, respectively.

The optical disc drive, having a front surface defined on a surface of the disc transfer member 2 shown in the left-hand side of FIG. 1, which can slide and project into an outside of a main body of the disc drive, is built into or attached outside of an information processing device or apparatus, such as, a PC (personal computer) or the like, for example, directing that surface into a front thereof. The disc mounting portion 20 of the disc transfer member 2, mounting the disc 1 thereon, is recessed or concaved in a size, being a little bit larger than the optical disc 1, and thereby defining a position where the optical disc 1 is mounted thereon. The optical disc, on which the optical disc apparatus can make recording or reproducing includes: a CD (i.e., Compact Disc), a CD-R (i.e., Compact Disc Recordable), a CD-RW (i.e., Compact Disc Rewritable), a DVD (i.e., Digital Versatile Disc), a DVD-R, a DVD-RAM (i.e., Digital Versatile Disc Random Access Memory), a DVD-RW, etc., and they are inserted or loaded into the optical disc apparatus, but without using a cartridge. Under the condition where the optical disc 1 is mounted on the disc transfer member (or the tray) 2, due to operation, such as, depressing an eject button (not shown in the figure), etc., the disc transfer member 2 moves gliding into the housing of the optical disc apparatus, thereby introducing the optical disc 1 into an inside of the apparatus. Then, a rotation device 3 (such as, a motor) goes up, to be engaged with an inner diameter of the optical disc 1, and therefore the optical disc is rotated in a clockwise direction by means of the rotation device (or the motor) 3.

The optical pickup 4, which is included in the unit mechanism 5, is movable in front and back of the optical disc drive, i.e., into a radial direction of the optical disc 1, and it moves into the radial direction of the optical disc upon receipt of a control signal from the control board 7, so as to irradiate the laser beam at a predetermined position on a recording surface of the optical disc 1, i.e., a lower surface, thereby recording or reproducing information thereon/from. A first penetrating hole 2a is provided, so that the rotation device (or the motor) 3 on the lower side of the disc transfer member (or the tray) 2 can be engaged with the optical disc 1 on the upper side thereof, and also that the optical pickup 4 on the lower side of the disc transfer member (or the tray) 2 can pass the laser beam through it, to be irradiated onto the optical disc 1 on the upper side thereof. For that reason, the first penetrating hole 2a is made up with a large opening, reaching from the disc mounting portion 20 in the periphery of the rotation device (or the motor) 3 up to an outside of the disc mounting portion 20 of the disc transfer member (or the tray) 2, directing into a rear side of the optical disc drive, i.e., an area where the optical pickup 4 moves, under the condition that the disc transfer member (or the tray) 2 is stored into an inside of the optical disc drive. The optical pickup has laser diodes 15a and 15b (see FIG. 10). The wavelength of the laser beam for use of CD, conducting recording/reproducing onto/from the CD is 785 nm, differs from that of the laser beam for use of DVD, 660 nm, and such the optical disc drive, as being capable to conduct recording/reproducing on both DVD and CD, like the present embodiment, has two (2) laser diodes. Moreover, the optical disc drive enabling to deal with the optical disc of using a blue-color laser beam (the wavelength: 405 nm), such as, a Blu-ray Disc (trademark) and a HD DVD (trademark), comprises a further one, i.e., a blue-color laser diode; i.e., three (3) pieces of diodes in total.

Within such the structures as was mentioned above, when the optical disc drive conducts the recording or reproducing operation, shearing force and centrifugal force are generated, with respect to an air surrounding the optical disc 1, due to rotation of the optical disc 1, as is shown in FIG. 5, i.e., the B-B cross-section in FIG. 2, thereby forming an airflow. On the lower surface of the optical disc 1, the air is sucked from the lower side of the disc transfer member (or the tray) 2, through the first penetrating hole 2a surrounding the rotation device (or the motor) 3, and the air flows between the optical disc 1 and the disc transfer member (or the tray) 2, due to the centrifugal force generated by rotation of the optical disc 1, directing from an inner periphery to an outer periphery thereof. A part of the air flows into an outside from the disc transfer member (or the tray) 2, and other part thereof rolls up into an upper side of the optical disc 1, and it flows into the inner periphery side.

On the other hand, in vicinity of an upper surface of the optical disc 1, the air flows directing from the inner periphery to the outer periphery of the optical disc 1, due to the centrifugal force due to rotation of the optical disc 1, and a part thereof flows outside from the upper surface of the optical disc 1. Since there is no flow-in passage for the air flowing from a side of center of the rotation, such as, the first penetrating hole 2a, for example, differing from the lower side of the optical disc 1, a pressure distribution is built up, i.e., the pressure is lowered down at a central side, on the upper surface of the optical disc 1. For this reason, on the side of the upper cover (or, the top case) 9, such a circulating flow is formed that the air turns back from the outer periphery to the inner periphery of the optical disc 1, and thereby generating the flow rolling up from the lower surface towards the upper surface of the optical disc 1, in particular, on the outer peripheral end thereof, as was mentioned above.

As is shown in FIG. 2, the above-mentioned flow running out from the disc transfer member (or the tray) 2 comes to be a flow of high-speed running into a peripheral direction, being similar to the peripheral speed of the disc 1 at the outer periphery, and after flowing out directing from the disc mounting cutout portion 21a to the outside of the disc transfer member (or the tray) 2, it collides upon the unit chassis 6, and therefore, a flow 1 accompanying the disc rotation directing into the first penetrating hole 2a, and a flow 2 accompanying with the disc rotation flowing directly from the upper and lower surfaces of the optical disc 1, are combined with each other. And, at the first penetrating hole 2a, it slips into the lower side of the disc transfer member (or the tray) 2, and reaches to a downstream side of the disc rotation.

FIG. 3 is a view of seeing the optical disc drive, obliquely, from a lower side thereof, and FIG. 4 is a view of seeing the A-A cross-section in FIG. 2, from a rear side of the optical disc. In this cross-section view, the optical disc 1 rotates so that it moves from the right-hand side to the left-hand side in FIG. 4. As shown in FIGS. 3 and 4, the flow, which slips into the lower side of the disc transfer member (or the tray) 2 from the first penetrating hole 2a, passes through a gap defined between the optical pickup 4 and the unit mechanism 5, etc., and it mainly flows from a side surface of the optical pickup 4 crossing the lower side, obliquely, and it goes up at the first penetrating hole 2a in vicinity of the position of the rotation device (or the motor) 3, thereby being supplied into the outer periphery side of the optical disc 1, through the function of the centrifugal force, etc., due to rotation of the disc 1, again.

In this instance, in case where the second penetrating hole 2b is provided at an upstream side of the disc rotation than the first penetrating hole 2a, on the outer periphery side of the disc 1, on the disc transfer member (or the tray) 2, as is shown in FIG. 2, then a suction flow (a secondary or upward flow) is generated, directing from the lower side to the upper side of the disc transfer member (or the tray) 2 through the second penetrating hole 2b, when the flow 1 of high speed accompanying with rotation of the optical disc 1 shown in FIG. 2, which flows out from the disc mounting cutout portion 21a mentioned above, passes through the second penetrating hole 2b, due to both the function of pulling a fluid at the second penetrating hole 2b by the shearing force accompanying the difference of the flow speed, and the function by the difference in pressure, between the high-speed flow under the condition that the pressure is lowered due to an influence of a low pressure portion, which is built up on the upper surface of the optical disc 1, and that on the lower side of the disc transfer member (or the tray) 2, and it flows into the direction of downstream of rotation of the optical disc 1 while being combined with a flow running out from the disc transfer member (or the tray) 2. On the lower side of the disc transfer member (or the tray) 2, since a flow is generated accompanying with the suction flow (or, the upward flow) mentioned above in an area or region of the optical pickup 4, where inherently the wind velocity is small, at an upstream side of the rotation, the wind velocity increases in the vicinity thereof, mainly on the surface of the optical pickup 4, on the upstream side of the disc rotation, within the lower side of the disc transfer member (or the tray) 2, as is shown in FIG. 4. When conducting recording or reproducing onto/from the optical disc 1, the laser beams, which generate from light emission of the laser diodes 15a and 15b within the optical pickup 4, are irradiated upon the optical disc 1, and at that instance, the laser diodes 15a and 15b generate heat by themselves, thereby increasing the temperature thereof. The laser diodes are kept at such a degree of temperature that they are not deteriorated, through radiating the heat of the laser diodes through the optical pickup 4. According to the present invention, it is possible to accelerate the heat radiation of the laser diodes 19a and 19b, by increasing the wind velocity in the periphery of the optical pickup 4, i.e., increasing the coefficient of convective heat transfer thereof.

Herein, as is shown in FIG. 11, the disc mounting portion 20 is built up with the disc mounting plane portion 20a, the disc mounting cutout portions 21a and 21b, the disc mounting convex portions 22a, 22b and 22c, and the disc mounting upper end portions 23a, 23b and 23c, and it is assumed that the outer periphery of the disc mounting portion is represented by those disc mounting upper end portions 23a, 23b and 23c. The disc transfer member (or the tray) 2 has a breadth, being a little bit wider than that of the optical disc 1 in a degree thereof. The disc mounting convex portions 22a, 22b and 22c define guides for mounting the optical disc 1 within the disc mounting portion 20, but the convex portions are interrupted on the way thereof, in particular, in vicinity of the end portions of the disc transfer member (or the tray) 2, thereby defining the disc mounting cutout portions 21a and 21b. Also, covering from the inside the disc mounting portion 20 up to the rear portion thereof is opened the first penetrating hole 2a.

A front penetrating holes 2c and 2d are provided for stabilizing the rotation of the optical disc 1. As was mentioned previously, when the optical disc 1 rotates, the flow of air is generated on the lower side of the optical disc 1, and in particular, above the first penetrating hole 2a is generated a hard ascending current (i.e., the upward flow), therefore the optical disc 1 is pushed up therewith. And, in case when there is no such front penetrating holes 2c, the posture of the optical disc 1 will not comes to be nearly parallel with the disc mounting portion 20, but is inclined in the front thereof. With provision of the front penetrating holes 2c, since the ascending current (i.e., the upward flow) is generated also through the front penetrating holes 2c, thereby pushing up the optical disc 1, it is possible to keep the optical disc 1 to be in parallel with the disc transfer member (or the tray) 2.

However, within the second penetrating hole 2b, a large part thereof are the suction flows (i.e., the upward flows), as is shown in FIG. 12, however there are cases where a descending flow is generated, partially, in particular, on the outermost peripheral portion, seeing from the rotation center thereof, since the flow collides on an end portion of the opening, but depending upon the shape or configuration of the second penetrating hole 2*b*. In this case, upon the side surface or the upper surface of the optical pickup 4, the descending flow is reversed into the flow to join with the suction flow (i.e., the upward flows), and therefore it is possible to obtain an effect of promoting or accelerating ventilation on the side surface, the upper surface and the lower surface of the optical pickup 4.

Also, since not being located just under or on the side surface of the optical disc 1, the second penetrating hole 2*b* will not affect an ill influence, directly, upon the distribution of pressure that acts on the optical disc 1. Accordingly, it is possible to promote or accelerate the heat radiation of the optical pickup 4, without affecting the ill influence upon rotational vibration of the optical disc, which causes problems in many cases when rotating at high speed.

Further, since the present embodiment has a simple or easy structure of opening the holes on the disc transfer member (or the tray) 2, it is possible to suppress an increase of power consumption of the optical disc drive, as a whole, as well as, lessening the number of the constituent parts thereof and reducing the cost thereof, comparing to the case of providing a fan within the optical disc drive.

However, the configuration of the second penetrating holes 2*b* should not be restricted only to that elongating into the directions covering the front and back of the optical disc drive, as shown in FIGS. 1 and 2, but it may be in the shape extending along the peripheral direction of the disc, as is shown in FIG. 6, for example. In this case, it does not come off, largely, from the lower side of the flow accompanying with the disc rotation, and thereby also obtaining the similar effect. Also, but not shown in the figure, with provision of a small-size penetrating holes in plural numbers thereof, in the place of the second penetrating hole 2*b*, it is possible to obtain the similar effect as was mentioned above, and thereby enabling to increase the strength of structures of the disc transfer member (or the tray).

With the second penetrating hole 2*b* mentioned above, it is determined that a total area S thereof be at least larger than the sum of areas S1 and S2 of the projections 19*a* and 19*b* of all the laser diodes, as being main heat-generating parts among those parts which are mounted on the optical pickup 4 shown in FIG. 10, onto the optical disc 1 or the imaginary enlarged surface 18 of the optical disc 1. This is because, with the penetrating area smaller than the sum of the projection areas 19*a* and 19*b* of the laser diodes, as being the main heat-generating parts, it is impossible to obtain an effective flow rate of suction (i.e., the upward flow), and then heat radiation cannot be promoted or accelerated by the ventilation around the optical pickup 4.

In the above, although the explanation was made about the optical disc drive mounting two (2) pieces of the laser diodes 19*a* and 19*b* on the optical pickup 4, however the number of the laser diodes should not be restricted only to two (2) pieces, and the optical disc drive may comprises one (1) piece, or three (3) or more, including the blue-color laser diode therein.

Embodiment 2

Figure 7:
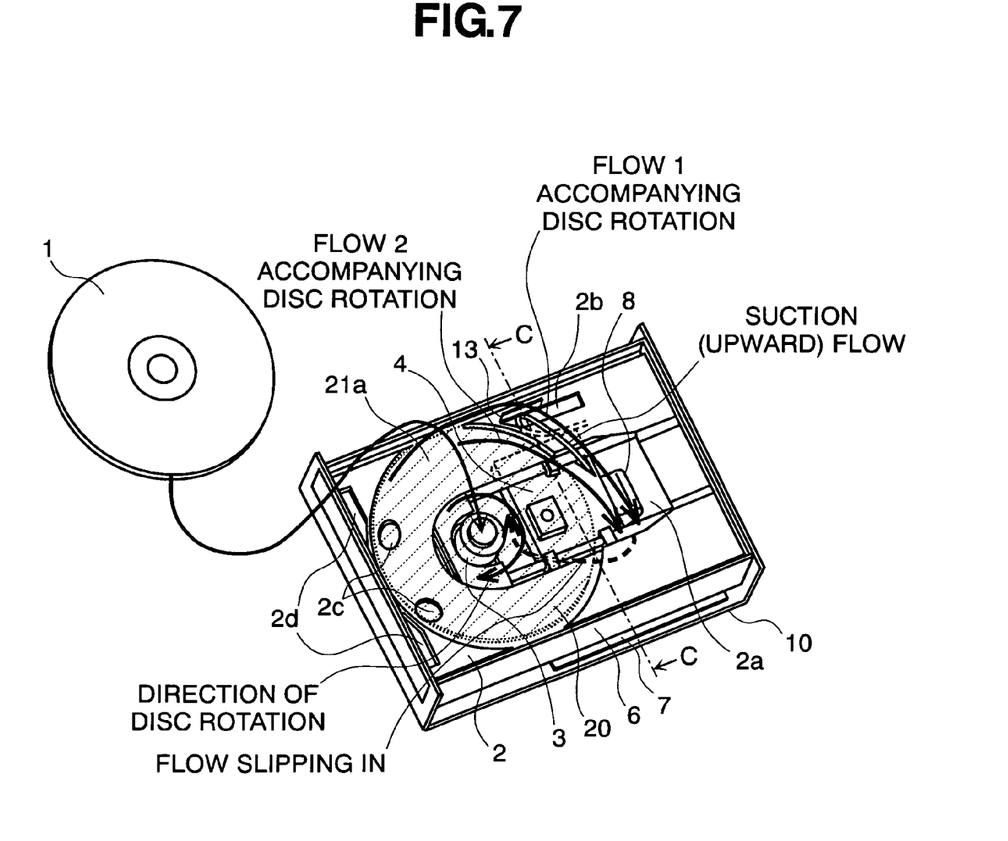
FIG. 7 is a perspective view for showing the optical disc drive, according to the second embodiment of the present invention.
Figure 8:
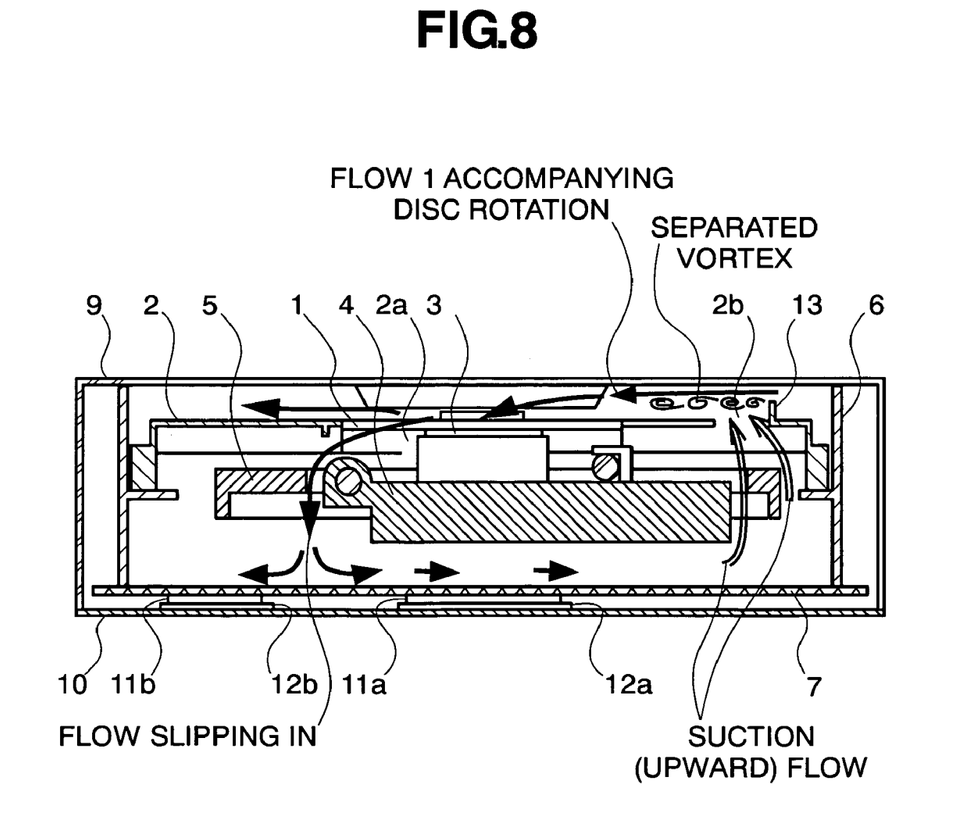
FIG. 8 is a cross-section view for showing the optical disc drive, according to the second embodiment of the present invention.

Next, other embodiment of the present invention will be shown in FIGS. 7 and 8. This FIG. 8 shows the C-C cross-section in FIG. 7. In those FIGS. 7 and 8, a reference numeral 13 depicts a projection or protuberance. In those FIGS. 7 and 8, the protuberance 13 is provided within an upper side of the disc transfer member (or the tray) 2, at least, in a part of the upper flow side of rotation of the optical disc 1, with respect to the second penetrating hole 2*b*.

When the flow of high-speed flowing out from the disc transfer member (or the tray) 2 passes through above the protuberance 13, the flow separates within the downstream side of the disc rotation on the protuberance 13, and thereby generating separated vortex, as is shown in FIG. 8. Since pressure comes to be low, locally, at the center of the vortex, the pressure on the upper side of the second penetrating hole 2*b* falls down, comparing to the case where no protuberance 13 is provided. Accordingly, the pressure difference comes to be large between the upper surface and the lower surface of the disc transfer member (or the tray) 2, and then the flow rate of suction (i.e., the upward flow) increases, flowing from the lower side of the disc transfer member (or the tray) 2 where the optical pickup 4 is disposed, through the second penetrating hole 2*b*. The coefficient of convective heat transfer due to the airflow passing in vicinity of the optical pickup 4 is increased, and therefore, it is possible to promote or accelerate the heat radiation of the optical pickup 9, further more.

Though FIG. 7 shows a drawing of providing the protuberance 13 only on the side near to the optical disc 1, assuming that the flow running out from the disc transfer member (or the tray) 2 is biased onto the outer periphery of the optical disc 1, however the protuberance 13 may be provided only on the side far from the optical disc 1, depending on the structures of the optical disc drive and a place where the flow is built up, or alternately over the entire of upstream side of rotation of the optical disc 1, in the place thereof.

Also, though FIG. 8 shows a figure of showing provision of something being cubic in the configuration thereof, in a pool of the second penetrating hole 2*b*, but it should not be limited to that configuration, but may be in other shape, as far as the similar effect can be obtained.

According to the present embodiment, with such provision of the protuberance 13 that the separated vortex is generated by the protuberance provided in the upstream side of the disc induction flow within the second penetrating hole 2*b*, a low pressure portion is built up, locally, and therefore it is possible to increase the suction flow (i.e., the upward flow) from the second penetrating hole 2*b*, and also promote or accelerate the heat radiation of the optical pickup 9.

Embodiment 3

Figure 9:
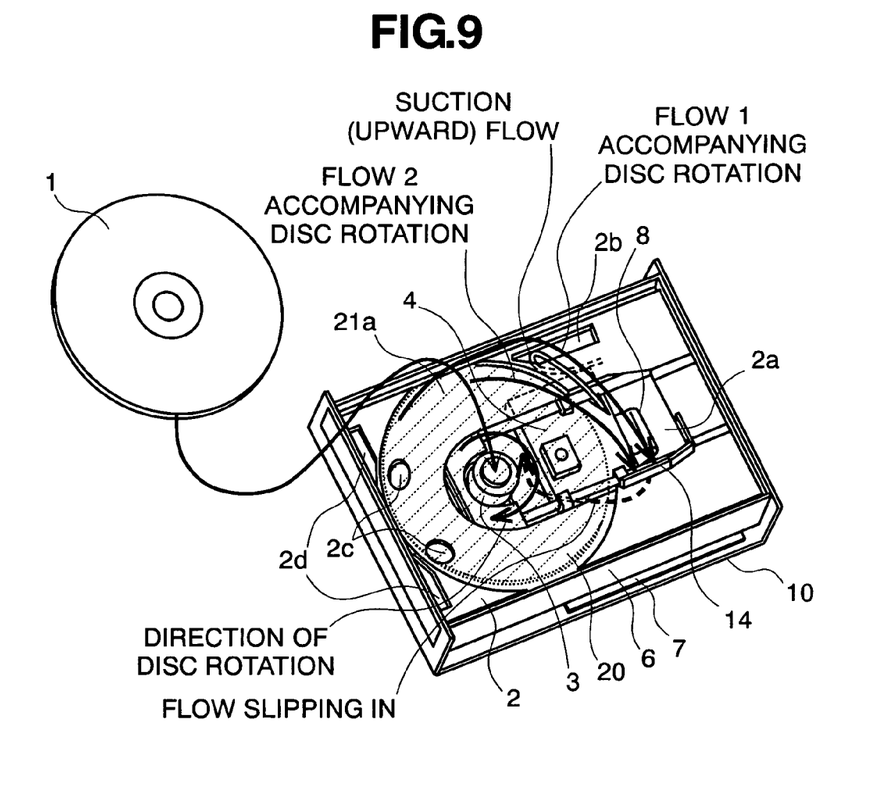
FIG. 9 is a perspective view for showing the optical disc drive, according to a third embodiment of the present invention.

Next, other embodiment according to the present invention will be shown in FIG. 9. In this FIG. 9, a reference numeral 14 depicts also a projection or protuberance.

In FIG. 9, the protuberance 14 is provided within an upper side of the disc transfer member (or the tray) 2 having the second penetrating hole 2*b*, and in particular, at least in a part of the downstream side of rotation of the disc 1, on an edge portion of the first penetrating hole 2*a*.

Depending on the structures of the optical disc drive, when the airflow of high-speed running out from the disc transfer member (or the tray) 2 passes through above the second penetrating hole 2*b*, the direction of flow is changed into the side of the upper cover (i.e., the top case) 9, upon receipt of the influence of the suction flow (i.e., the upward flow) from the second penetrating hole 2*b*, and therefore there is a possibility that flow running into the first penetrating hole 2*a* is reduced in an amount thereof. With provision of the protuberance 14 in the upper side of the disc transfer member (or the tray) 2 and on the edge portion of the first penetrating hole 2*a* within the downstream side of the disc rotation, the airflow is blocked out by the protuberance 14, and the flow into the lower side of the disc transfer member (or the tray) 2 is increased; therefore, it is possible to increase the ventilation to the optical pickup 4, and thereby promoting or accelerating the heat radiation.

According to the present embodiment, because of the function of the protuberance 14, which is provided on the edge portion of the first penetrating hole 2a of the disc transfer member (or the tray) 2, it is possible to promote or accelerate the heat radiation of the optical pickup, by making the disc induction main flow running easily from the first penetrating hole 2a into the lower side of the disc transfer member (or the tray) 2, even if it is drawn or biased towards the upper side, due to the influence of the suction flow (i.e., the upward flow) from the second penetrating hole 2b, thereby enabling to promote or accelerate the heat radiation of the optical pickup.

Embodiment 4

Next, other embodiment according to the present invention will be shown, by referring to FIGS. 4, 10, 13 and 14. In the present embodiment, a temperature detecting means (i.e., a temperature detector) is provided within the optical pickup 4, as is shown in FIG. 10, and when the temperature detecting means (i.e., the temperature detector) 24 detects that the temperature goes up to be equal or higher than a preset temperature "Temp 1" when the optical pickup conducts the reading or writing operation from/onto the optical disc 1, a control unit built within the element 11a interrupts irradiation of the laser beam, for the purpose of preventing the heat-radiation parts, such as, the laser diodes 15a and 15b, etc., from being deteriorated in the lifetime thereof. In this instance, the optical disc 1 continues the rotation thereof, and the optical pickup 4 is cooled down by the flow, which is induced due to the rotation of the optical disc 1.

Because of the provision of the second penetrating hole 2b, an effect of heat-radiation on the optical pickup 4 due to the ventilation is large, and it is possible to lower the temperature of the optical pickup 4 within a short time-period. When the temperature detecting means (i.e., the temperature detector) 24 detects that the temperature falls down to be equal another preset temperature "Temp 2" or lower than that, the irradiation of the laser beam starts, again; therefore, it is possible to re-start the reading or the writing from/onto the optical disc.

According to the present embodiment, even in the case where ambient air temperature increases, temporarily, in an outside of the optical disc drive, or when conducting the writing onto the optical disc, continuously, it is possible to continue the use of the optical disc drive, with only an increase of a very little of time for cooling, but without detracting the lifetime of the parts, such as, the laser diodes, due to high temperature. Also, it is effective that the rotation speed or number of the optical disc, when the temperature goes up, is set up to be higher than that when the laser beam is irradiated.

With this, even in the case when the optical pickup 4 is heated up, excessively, for example, due to an excessive increase of the ambient air temperature where the optical disc drive is installed, it is possible to suppress the heat-generation within the optical pickup 4, by interrupting the irradiation of the laser beam, as well as, rotating the optical disc 1 at the rotation speed, at least being equal or higher than that before interrupting the irradiation of laser beam; thereby, promoting or accelerating the heat radiation of the optical pickup 4 through the flow induced by rotation of the optical disc 1. In particular, with an aid of the suction flow (i.e., the upward flow) generated within the second penetrating hole 2b, the ventilation is promoted, even in a portion of the optical pickup 4, where inherently the flow velocity is small, and thereby lowering temperature of the optical pickup within a short time-period. Then, it is possible to re-start the irradiation of laser beam upon the optical disc 1, thereby obtaining an effect of enabling an access onto the optical disc 1, without detracting the lifetime of the laser diodes 15a and 15b.

Also, in the place of detecting that the temperature of the optical pickup 4 falls down to be equal or lower than the preset temperature "Temp 2", it is possible to make a control of conducting the rotation of the optical disc 1, only for a predetermined time-period.

Further, with the preset temperature "Temp 1" and the preset temperature "Temp 2" mentioned above, the preset time "t1", and the rotation speed (or, number) of the optical disc, they are set up to values, different from one another for each of the kinds of the optical discs (for example, CD-R, CD-RW, DVD-R, DVD-RW, DVD-RAM, and DVD-double layer write-in), or for each of the rotation speed when reading or writing (for example, a double-speed (2×), a quad-speed (4×), an eight-speed (8×), and a sixteen-speed (16×)), and they may be given to the control unit in advance, in the form of input data, for example. The higher the laser output, the larger the heat generation, and therefore it is preferable to determine the preset temperatures "Temp 1" and "Temp 2" to be low, or the preset time "t1" to be long, and as the laser output comes to be lower, to determine the preset temperatures "Temp 1" and "Temp 2" to be high, or the preset time "t1" to be short.

For example, in case of the DVD-dual layer write-in, wherein the laser irradiation output is high under a low rotation speed, for example, it is possible to use the optical disc drive, continuously, while lowering a frequency of interruptions of laser irradiation, by setting the rotation speed of the disc 1 to be high when the optical pickup 4 is heated up excessively, as well as, setting the preset temperature "Temp 2" to be low (or, the preset time "t1" to be long).

With this, by changing the rotation speed of the optical disc, the set-up temperature for cooling, and the time period of cooling, etc., depending upon the kind, the reading speed, and writing speed of the optical disc 1, it is possible to obtain the most suitable cooling under the respective conditions, with lessening the frequency of interruption of the laser irradiation, thereby continuing the use of the optical disc drive.

According to the present invention, the suction flow (or, the upward flow) is generated from the lower side of the disc transfer member (or the tray), through the second penetrating hole, by using the shearing force and the pressure difference, which are caused when the disc induction flow running at high-speed on the disc transfer member (or the tray) passes through, so as to enable to promote or accelerate the ventilation in a portion of the optical pickup, in the upstream side of rotation, where an ambient wind velocity is small, and thereby accelerating the heat-radiation of the optical pickup, with suppressing an increase of temperature thereof.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An optical disc drive comprising:
   a rotation device that rotates an optical disc in a clockwise direction when an upper surface of said optical disc is viewed by engaging an inside of an inner diameter of said optical disc;

a disc mounting portion for mounting of said optical disc thereon has a recess portion of a size slightly larger than a size of said optical disc so as to delimit a position where said optical disc is mounted thereon; and an optical pickup which irradiates a laser beam on a lower recording surface of said optical disc so as to enable recording or reproducing information thereon, and said optical pickup being movable in a radial moving area direction of said optical disc;

wherein said disc mounting portion includes a first penetrating opening portion therethrough that extends from a center area of said recess portion to a periphery of said recess portion including said rotation device and said optical pickup moving area, thereby enabling engagement of said rotation device with said optical disc and irradiation of the laser beam onto said optical disc therethrough;

wherein said disc mounting portion includes a disc mounting convex portion which guides mounting of said optical disc within said disc mounting portion, said disc mounting convex portion having a disc mounting cutout portion, and wherein said disc mounting convex portion is formed so as to be interrupted at right and left sides of said disc mounting convex portion as viewed from a front of said disc mounting portion;

wherein said disc mounting portion includes only a single second penetrating opening portion therethrough being provided at a rear of said disc mounting portion and periphery, said only single second penetrating opening portion being provided only at one portion of the rear of the disc mounting portion which is at an upstream side of the clockwise rotating direction of said optical disc with respect to a center line of said first penetrating opening portion extending from the front to the rear of said disc mounting portion so as to guide airflow caused by rotation of said optical disc into an inside of said optical disc drive;

wherein said only single second penetrating opening portion is provided at an outer peripheral side of said optical disc so as not to be located just under or on a side surface of said optical disc and to be located on only one side of the center line without a corresponding penetrating opening portion being located on an opposite side of the center line;

wherein said only single second penetrating opening portion has first and second sections, wherein said first section has a substantially constant width and said second section has a width which decreases in a direction towards said recess portion;

wherein said only single second penetrating opening portion enables the airflow caused by the clockwise rotation of said optical disc to flow out from said disc mounting cutout portion and pass through said single second penetrating portion; and wherein said disc mounting portion includes at least one third penetrating opening portion therethrough being provided at the front of said disc mounting portion in said recess portion thereof.

2. The optical disc drive as described in the claim 1, further comprising a temperature detector for detecting a temperature of said optical pickup, wherein irradiation of said laser beam is stopped while bringing rotation speed of said optical disc to be equal to or higher than that before stopping the irradiation of said laser beam, when the temperature of said optical pickup is higher than a predetermined temperature.

3. The optical disc drive as described in the claim 2, wherein said predetermined temperature or the rotation speed of said optical disc is changed depending upon a kind of said optical disc, or a speed for reading/writing said optical disc.

4. The optical disc drive as described in the claim 1, wherein said only single second penetrating opening portion is configured to enable guiding of the airflow inside of said optical disc drive so as to suppress increase of temperature of said optical pickup during at least one of a recording and reading operation of said optical disc.

5. The optical disc drive as described in claim 1, wherein said at least one third penetrating opening portion includes two third penetrating opening portions provided at the front of said disc mounting portion in said recess portion thereof at opposite sides with respect to the center area of said recess portion.

6. The optical disc drive as described in claim 1, wherein said only single second penetrating opening portion is provided at the rear of said disc mounting portion outside of said recess portion thereof.

7. The optical disc drive as described in claim 1, wherein said disc mounting portion includes at least one fourth penetrating opening portion therethrough being provided at the front of said disc mounting portion outside of said recess portion thereof.

8. The optical disc drive as described in claim 7, wherein said at least one fourth penetrating opening portion includes two penetrating opening portions provided at the front of said disc mounting portion outside of said recess portion thereof at opposite sides with respect to the center area of said recess portion.

9. The optical disc drive as described in claim 1, wherein said only single second penetrating opening portion is disposed proximate to the left side of said disc mounting convex portion with respect to the center line.

10. The optical disc drive as described in claim 1, wherein said only single second penetrating opening portion is delimited by an opening which is completely surrounded by a portion of said disc mounting portion.

11. The optical disc drive as described in the claim 1, wherein said only single second penetrating open portion enables a suction flow therethrough from a bottom of said disc mounting portion to a top of said disc mounting portion.

12. The optical disc drive as described in the claim 10, wherein said portion of said disc mounting portion which completely surrounds said opening of said only single second penetrating opening portion includes a first portion extending over a first distance in a first direction from a portion of a first edge of said opening adjacent to a closest edge of said first penetrating opening portion to said closest edge of said first penetrating opening portion and a second portion extending over a second distance in a second direction which is opposite to said first direction from said portion of the first edge of said opening to a closest edge of said disc mounting portion, wherein said first distance is greater than said second distance.

* * * * *